United States Patent Office 2,978,100
Patented Apr. 4, 1961

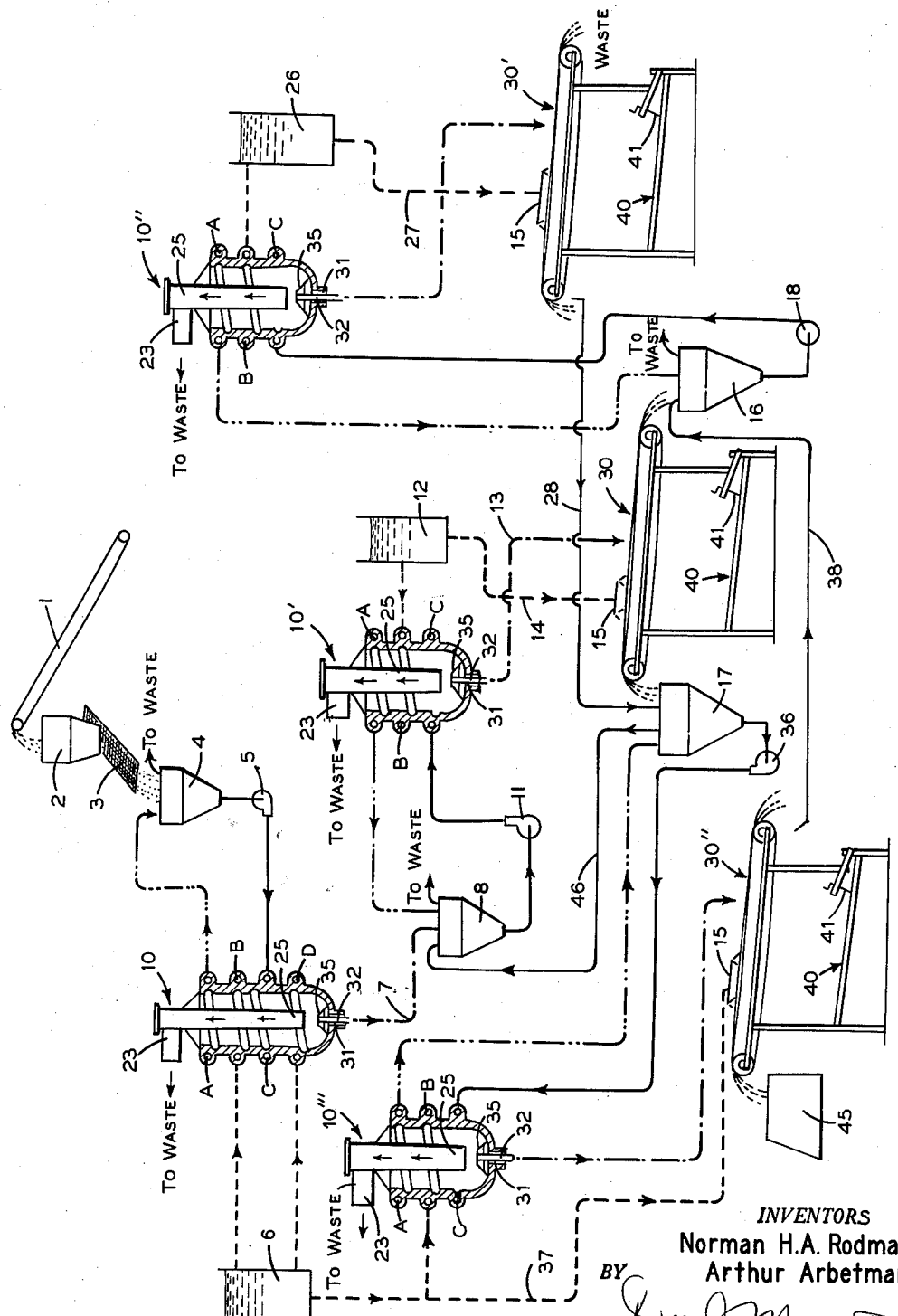

2,978,100

METHOD OF AND APPARATUS FOR CONCENTRATING AND SEPARATING ORE

Norman H. A. Rodman and Arthur Arbetman, Virginia, Minn., assignors to Oreclone Concentrating Corporation, New York, N.Y., a corporation of New York Filed Feb. 3, 1959, Ser. No. 790,878

9 Claims. (Cl. 209—18)

This invention relates to ore concentration and separation and, more particularly, to a novel method of and apparatus for concentrating and separating ore from tailings without the necessity of a preliminary desliming operation and effective to recover a substantial portion of fines hitherto discarded, as well as to recover a higher proportion of ore at less investment cost and no greater maintenance and operating costs than the most efficient prior art ore concentration techniques and apparatus.

Due to the depletion of high grade iron ores in economically accessible locations, considerable attention has been given to the concentration and separation of low grade ores. Relatively efficient means have been provided for magnetic iron ores, such as taconite ores, but these means are not applicable to the much more abundant non-magnetic iron ores. In addition, there is considerable interest in the economical recovery of significant ore values from tailing dumps and ponds and from the waste piles of ore washing plants.

A major factor in such concentration and separation of iron ores, both from waste supplies and from fine grained, low grade natural iron ores, is the separation of lighter fines, such as silica, from the heavier particles of iron, utilizing the differences in specific gravity. Substantially all known recovery processes require a desliming operation in advance of the concentrating and separating operation. This desliming operation removes very fine sludge and waste from the feed, and may be effected by thickening apparatus or classifiers which cause a flow of the very fine sludge and waste from a feed and water mixture. This desliming equipment is bulky, complicated and comparatively expensive to install, maintain and operate.

In addition, known recovery processes and apparatus requires a further classification of feed by mesh or screen size, generally with rejection of all feed passing a 150 mesh screen. Hence, there is no recovery of ore fines of less than this screen size. The capacity of such apparatus is substantially fixed, and the ratio of the concentrate to the separated fines cannot be adjusted, particularly during operation. This is a disadvantage when dealing with ores of varying metallurgical composition. Furthermore, the weight and bulk of the apparatus are such that it is not economically feasible to move the apparatus from one location to another.

A known form of mineral separating and concentrating apparatus for high efficiency comprises a concentrating chamber of generally circular cross-section having a tailings discharge outlet in the top thereof and a concentrating discharge outlet in the bottom thereof, axially aligned with one another, an injector for discharging mineral containing sludge into the chamber, an air inlet tube disposed in the concentrate discharge outlet and extending into the chamber, a concentrate separating head disposed above the concentrate discharge outlet and surrounding the air inlet tube, the head being spaced from the bottom of said chamber to form a passage therebetween leading to the concentrate discharge outlet, the separating head being formed with a splitting edge adjacent the passage for separating the concentrate from the sludge as the former moves into the passage. In addition, this apparatus embodies an injector having a spirally disposed passage for introducing mineral containing sludge into the chamber in a substantially circular path within the chamber wherein an initial part of the passage spirals around the chamber, exteriorly of the inner surface thereof, in a horizontal plane, a second part thereof circles downwardly at an incline, and a third and final portion spirals in a horizontal plane within the chamber, the passage gradually opening into the chamber at a point intermediate its extent, from zero opening to full extent at the terminal end of the passage, and in gradually decreasing depth to zero depth in the final portion of its extent whereby to maintain the heavier mineral content in the passage over a substantial portion of its travel therein while discharging lighter foreign material continuously from its point of opening to its point of termination, the heavier mineral concentrate being caused to discharge from the passage in its portion of final extent as its depth decreases and at a level below the first point of entry of the sludge to said chamber.

In the copending application of Norman H. A. Rodman et al., Serial No. 713,641, filed February 6, 1958, there is shown and described a multi-stage concentrator unit comprising a stack including a plurality of such known concentrators arranged in predetermined cooperating relation. This multi-stage unit includes a stack of at least three such concentrators, one or more of which may be modified as to direction or orientation of the feed input, and one of which is utilized as a middlings outlet or separator. In the concentrator shown in said copending application, the uppermost stage concentrator is used to introduce water under pressure in a downwardly directed spiral flow to act as a "wash down" of light fines. The next lower stage concentrator is used as a middlings outlet or separator having the same physical arrangement and orientation as the uppermost stage but providing flow of the feed in an upwardly directed spiral and then in a tangential outward direction.

Immediately below the middlings exit stage is the feed injection stage. This unit, which may be physically identical with the two units thereabove, is reversed as to orientation and direction of flow with respect to the uppermost unit. In other words, the direction of feed injection is reversed as to the direction of water injection as respects the rotation direction of the spiral path. Also, the spiral path moves upwardly through the concentrator. As the rotary direction of middlings outflow is, of necessity, reversed as to the rotary direction of water in flow, it is in the same rotary direction as the feed injection.

While the vortex and cone splitter actions of the known concentrator unit are present in said multi-stage unit, the major part of the concentration is effected by centrifugal action. The feed injected through the feed injection stage under pressure moves circumferentially around this stage for a turn and a quarter and then moves along the upwardly spiralling inwardly opening passage whose gradually widening inner wall opening gradually merges into the flat inner surface of the unit. As the feed leaves the "flat" of the feed injection spiral it enters the "flat" of the upwardly extending middlings exit spiral whose inner opening gradually closes until the separated middlings and some concentrate moves circumferentially for a turn and a quarter in a closed passage, after which the middlings and such portion of the concentrate are tangentially discharged.

During this movement, the middlings and concentrate are separted from the lighter tailings by centrifugal force versus the action of gravity. There is no vortex or turbulence separation action from the feed injection stage to the middlings and some concentrate exit stage. Whatever fines are not carried out through the fines exit remain in suspension in the bowl of the apparatus.

More specifically, the centrifugal spray of water from the uppermost stage creates a turbulence in the center of the bowl while simultaneously washing the light tailings from the side walls of the feed injection and middlings exit stages. Also, this spray has a cleansing action on the heavier middlings moving upwardly along the inwardly open portions of the injection and exit stages between the closed circumferential passages of these two stages.

Furthermore, the turbulence is present as in the known single stage unit so that fines from the feed injection stages, plus fines separated from the walls of the injection and exit stages and those rubbed off the middlings and concentrate while moving upwardly through the inwardly open portions of the injection and exit stages, move into the vortex above the splitter and are moved upwardly to the fines exit or discharge.

The splitter at the bottom of the apparatus effects some separation but no longer is required to do the major part of the separation as the major separation is effected by centrifugal action which is essentially a separation based on weights or densities.

The pressure used in injecting the feed is such that, coupled with the centrifugal force, the effect is that there is very little dropping of middlings or concentrate toward the splitter outlet due to gravity. Such concentrate as may drop is further scrubbed of fines by the turbulence or vortex action and the heavier particles move outwardly toward the surface of the injection and exit stages for discharge from the exit stage.

A four-stage unit may be provided by including a second water injection stage beneath the feed injection stage to provide a spiralling spray of water under pressure to further wash fines from any concentrate settling toward the concentrate or splitter outlet.

Also, in the copending application of Norman H. A. Rodman, Serial No. 707,824, filed January 9, 1958, now Patent No. 2,930,484, issued March 29, 1960, there is shown and described a novel concentrating conveyor in which effective concentration of the desired residue, which may be iron ore, for example, is effected by maintaining the tailings, such as silica, for example, separated from the charge in an upper compartment of an inclined endless conveyor, separated from the charges in each succeeding compartment in a downward direction. Specifically, the tailings from each compartment are washed or sluiced into one or more downwardly travelling tailing streams flowing parallel to the upwardly travelling steam of charges and concentrates. As a result, a high efficiency of concentration is effected on a single "pass" and the amount of recirculation required is reduced to a negligible value.

In a preferred embodiment of the apparatus, an endless belt conveyor is provided with cleats, bars, or ridges on its outer surface extending only part way thereacross so as to leave unriffled flow sections along each side of the thus riffled intermediate section. The conveyor is inclined and its upper run is supported on rollers so disposed as to maintain the lower end of the upper run substantially flat and the upper end with a relatively deep through shape, the trough progressively flattening or becoming more shallow from the upper to the lower end.

Each cleat or bar comprises a short upper section extending laterally of the belt, diagonally extending sections extending downwardly from each end of the upper section, and short legs extend from the ends of the diagonals parallel to and substantially spaced from the belt edges. The longitudinal legs of each cleat or bar extend to within a short distance of the corresponding legs of the next lower cleat or bar to leave "gates" for flow of tailings out of each "compartment" formed by adjacent riffles.

The material to be concentrated is discharged onto the upper run of the conveyor on the flat surface thereof just above its lower end, and the water flows over substantially the entire length of the upper run. The water washes out the tailings which flow through the gates onto the unriffled side portions of the belt. As the material moves up the conveyor path, with the trough progressively deepening, the heavier particles become more concentrated. There are two streams of downwardly moving tailings on the side of the upwardly moving heavier residue retained by the riffling and troughs. The tailings are discharged from the lower end of the conveyor.

The discharge of the material onto the flat surface of the lower end of the upper run of the conveyor has the important function of preventing contamination of the incoming feed material. As the wash down water flowing downwardly over the conveyor traverses the gradually flattening surface, the tailings including silica are carried to the unriffled flow paths laterally outside the upwardly moving feed.

In accordance with the method and apparatus of the present invention, a plurality of such multi-stage concentrators and a plurality of such concentrating conveyors are used in a novel cooperative relation together with sumps, reservoirs and sand pumps to provide highly effective concentration of ore without the necessity of any preliminary desliming operation. In addition, the apparatus is comparatively inexpensive, easy to install, economical to operate and maintain, and readily and easily dismantled for erection at a new location.

In practicing the invention method, the tailings, waste, or crushed fresh ore is discharged from a loading or storage bin onto a travelling or vibrating screen which removes all material over ⅛ inch in size, such as rocks, roots, stumps, mud balls, etc. The material below ⅛ inch size is discharged into a primary sump or hopper from which it is injected by a sand pump into the feed stage of a fourstage concentrator unit such as described in said application Serial No. 713,641, and which has clean water injected into two stages thereof. The slimes or tailings from this unit are discharged to waste, while the ejected middlings are returned to the primary sump to act as a re-circulating load enriching the feed.

The concentrate passing beneath the splitter is discharged to a secondary sump or reservoir from which it is injected by a sand pump into a three-stage concentrator unit having a clean water injection for further cyclonic and centrifugal water washed separation of fines and middlings. The slime and tailings are discharged to waste and the middlings are re-circulated to the secondary pump to form a circulating load further enriching the feed. The concentrate from this three-stage unit is charged onto a concentrating conveyor of the type forming the subject matter of said Patent No. 2,930,484.

This concentrating conveyor is designated the "rougher" conveyor or belt and is supplied with clear wash water. The wash back water and the middlings from the conveyor are discharged to a middlings sump or reservoir, and the wash down water and concentrate are discharged to a rough concentrate sump or reservoir. The material in the middlings reservoir or sump is injected by a sand pump into a second three-stage concentrator unit having clean water injected thereinto.

The slime and tailings from this second three-stage unit are discharged to waste, the middlings are recirculated to the middlings sump, and the concentrate is discharged onto a second concentrating conveyor supplied with clean water. The wash back water and tailings from this conveyor are discharged to waste, while the wash down water and concentrate are returned to the rough concentrate sump or scavenger belt.

The material from this latter sump is injected into a third three-stage concentrator unit having clean water injected thereinto. The slime and tailings from this unit are discharged to waste, while the middlings are re-circulated to the rough concentrate sump to enrich the feed. The concentrate from this unit is discharged onto a third concentrating conveyor supplied with clean water and designated the "finisher" belt or conveyor. The wash back water and tailings from this conveyor are re-circulated to the middlings reservoir, while the wash down water and finished concentrate are discharged to a de-watering device.

The overflow of slimes from the primary, secondary, and middlings sumps or reservoir are discharged to waste, while the overflow of slimes from the rough concentrate reservoir or sump is recirculated to the secondary sump.

For an understanding of the invention principles, reference is made to the following description of a typical embodiment thereof as illustrated in the accompanying drawing. In the drawing, the single figure is a pictorial flow sheet illustrating the invention method and apparatus.

Referring to the drawing, the raw material, such as tailings, waste, or crushed fresh ore, is delivered by a conveyor 1 to a primary sump or reservoir 2 from which it is discharged onto a vibrating screen 3 which rejects material above ⅛" size and passes material less than ⅛" size to a primary sump or reservoir 4. A sand pump 5 injects feed from reservoir 4 into concentrator C of a four-stage concentrator unit 10 of the type forming the subject matter of said copending application Serial No. 713,641. Clean water from a source 6 is injected into concentrators B and D of unit 10. The separating action in unit 10 is substantially the same as described in said copending application Serial No. 713,641. However, whereas the concentrator apparatus of said application Serial No. 713,641 involves an arrangement wherein the water is injected under pressure into the topmost unit and the middlings exit from the unit immediately below the topmost unit, in the present application it has been found that a more efficient separation action can be obtained by injecting the water under pressure into the unit immediately beneath the topmost unit, whereby the feed injected into the unit immediately below the water injection unit will pass through the water injected unit and flow upwardly into the topmost unit, where the separated middlings and part of the separated concentrate are tangentially ejected. The slimes and tailings flow upwardly through a vortex finder tube 25 and are discharged to waste through a side outlet tube 23. The middlings are ejected from concentrator A and returned to sump 4.

A high pressure water spray (not shown) is applied to screen 3 to aid in breaking up clay, mud balls, and the like which may contain iron fines. The primary sump or reservoir 4 is a large tank receptacle having no moving parts.

As the feed to unit 10 is injected in an upwardly spiralling direction and the clean water in a downwardly spiralling direction, the water carries downwardly the loose silica particles and the very fine slimes, which are then pulled up through vortex finder tube 25. By increasing the water pressure, heavier particles of silica are washed downwardly and discharged through tube 25. Thus, regulation of the water pressure can be used to control the separating action in unit 10, and the fresh clean water is one of the main factors in producing a deslimed concentrate and one with a low silica content.

In unit 10, as well as in the other separating and concentrating units, the part of the feed that is ejected or rejected becomes the middlings, and the middlings are returned to the sump from which the feed is pumped to the particular unit. The middlings thus become the re-circulating load, or "middlings return," comounting to about 15–20% of the supply to the unit. Not only does this re-circulation enrich the feed but also, as the middlings ejected from a unit are always returned to a supply sump for that unit, a "normal balancing" occurs so that at no time does the system load tend to build up. Consequently, no so-called "plugging up" occurs.

Unit 10 includes an air tube 32 coaxial with vortex tube 25 and extending through a cone shape splitter 35, the concentrate separated by splitter 35 flowing through annular outlet 31 and thence through a line 7 to a secondary sump or reservoir 8 which is a large container with no moving parts. A sand pump 11 injects feed from sump 8 into concentrator C of a three-stage unit 10' of the type forming the subject matter of said copending application Serial No. 713,641 having its concentrator B supplied with clean water from a source 12. However, the three stage unit 10' differs from that of said application Serial No. 713,641 in that the water, instead of being injected under pressure into the topmost unit, is injected under pressure into the intermediate unit, and the middlings and some of the concentrate, instead of being tangentially discharged from the intermediate unit, are tangentially discharged from the topmost unit. The slimes and tailings are again ejected to waste through tube 25 and outlet 23, and the ejected middlings are recirculated to sump 8.

The concentrate flowing beneath splitter 35 is discharged by a line 13 onto a concentrating conveyor belt 30 of the type forming the subject matter of said Patent No. 2,930,484. As described in said patent, conveyor belt 30 has riffles (not shown) on its outer surface so arranged as to form concentrating "pockets" with lateral outlets. The belt is mounted on a framework 40 which includes means 41 for adjusting the pitch of belt 30. Water from source 12 is supplied by a line 14 to sprays 15 directing water against the upper outer surface of belt 30 at a point above and upstream of the point of discharge of concentrate onto the belt and into the "pockets" thereon.

As described in said Patent No. 2,930,484, the water, flowing over the concentrate in the "pockets" on belt 30, washes the lighter material through the lateral outlets of the "pockets" and down the belt to where the wash back water and separated middlings are discharged into a middling sump or reservoir 16. The concentrate retained in the belt pockets is discharged from the upper end of belt 30 into a "rough concentrate" sump or reservoir 17.

A sand pump 18 injects feed from sump 16 into concentrator C of a three-stage unit 10'' identical with unit 10' and having water supplied to its concentrator B from a source of clean water 26. The slimes and tailings from unit 10'' are again discharged to waste through tube 25 and outlet 23, and the middlings ejected from concentrator A are re-circulated to sump 16. The concentrate from unit 10'' is discharged into the riffle pockets of a concentrating belt conveyor 30' identical with belt 30 and having its spray 15 supplied with clean water from source 26 through a line 27.

Conveyor 30' is designated a "scavenger belt," and the wash back water and fines or tails separated thereon are discharged to waste. The concentrate is discharged from the upper end of conveyor 30' and returned by a line 28 to a "rough concentrate" sump 17.

A sand pump 36 injects feed from sump 17 into concentrator C of a three-stage unit 10''', identical with units 10' and 10'', and having its concentrator B supplied with clean water from a suitable source, such as source 6. In unit 10''', the slimes and tailings are again discharged to waste through tube 25 and outlet 23, and the middlings ejected from concentrator A are recirculated to sump 17. The concentrate from unit 10''' is discharged into the riffle pockets of a concentrator belt conveyor 30'' which is identical with belts 30 and 30', and has its spray 15 supplied with clean water through a line 37 connected to source 6 or to any other suitable source of clean water.

The wash back water and tails discharged from the lower end of conveyor 30'' are recirculated to sump 16 through a line 38, and the finished concentrate and wash down water is discharged from the upper end of "finisher belt" 30" either directly or through a storage reservoir into a de-watering device 45.

It will be noted that, while the overflow from sumps 4, 8, and 16 is discharged to waste, that from sump 17 is recirculated to sump 8 by a line 46. In addition, stationary and oscillating fingers (not shown) are associated with each concentrator belt to cut channels into the solid masses of concentrate thereon and "stir up" these masses so that silica particles at the bottom of the masses will "break away" from the iron and rise to the top of the masses to be washed out through the lateral outlets of the pockets.

As a further feature, groups of high strength magnets are imbedded in the concentrator belts around the pockets to capture magnetic ores, if present. These magnetic ore particles are washed off at the upper ends of the belts by high pressure water sprays (not shown). In addition to the capture effect, the magnets set up further magnetic attraction between ore particles to enhance the build-up of high grade concentrate in the pockets. These magnets tend to capture a high percentage of the very fine mesh iron particles which, in prior art processes, can be recovered only by expensive flotation techniques or are discharged to waste.

The "pulp density," which is the ratio between the feed and the water, can be readily controlled during operation by varying the water supply rate at any water entry point in the process, or by varying the speed of conveyor 1 to control the amount of feed entering the system. The speeds of the sand pumps may also be varied to control the pumping pressure. These adjustments provide for ready setting of the system to handle either leaner feeds or richer feeds.

The practically de-slimed concentrate fed to the concentrator belts 30, 30', 30" can be controlled as to final quality by adjustment of the pitch and/or speed of these belts to control the time of travel and degree of washing away of fines. The water used in the system can be filtered and re-used time and again.

Starting with a feed containing 2–7% of iron, the process produces a finished concentrate containing 60% or more of iron and with the silica content reduced by at least a minimum of ⅔ of its original value, so that the final silica content is less than 10%. In comparative tests of the invention process and the best prior art process on tailings of a painty nature and high in alumina, the invention process operated on a 33% solids feed whereas the prior art process was able to operate on a 20% solids feed. The weight recovery was 46.8% for the invention system and 28.95% for the prior art system, with the respective iron recoveries being 63.71% and 40.06%. In addition, the prior art system required previous desliming of the feed, whereas the invention system, without such desliming, reduced the alumina from 2.00% in the feed to 1.08% in the finished concentrate.

While a specific embodiment of the invention has been shown and described in detail to illustrate the application of the invention principles, it will be understood that the invention may be embodied otherwise without departing from such principles.

What is claimed is:

1. A method for concentrating a feed of ore tailings, waste ore, or crushed fine ores containing slimes, comprising the steps of classifying the feed directly as received to reject particles above a predetermined size and deliver feed below such predetermined size to a sump; injecting the feed from such sump tangentially into a concentrator to flow helically upwardly therein; injecting water under pressure into said concentrator at a level above the level of feed injection to flow helically downwardly therethrough; subjecting the helically upwardly flowing feed to the helically downwardly flowing stream of clean water to separate the feed into tailings and slimes, middlings, and concentrate; subjecting the tailings and slimes to a vortex action in the concentrator to move them axially upwardly of the concentrator to waste; ejecting middlings tangentially from such concentrator and recirculating the middlings to such sump; withdrawing the concentrate axially downwardly of the concentrator for discharge from the concentrator; moving the concentrate from the concentrator in substantially segregated masses upwardly along a sloping path while flowing water over the segregated masses to wash fines therefrom; discharging separated fines and water from the lower end of such path; discharging the separated concentrate from the upper end of said path; recirculating the discharged fines and water, as feed, to the concentrator for further concentrating action; and de-watering the discharged concentrate.

2. A method as claimed in claim 1 including feeding the concentrate to a second like concentrator for further concentrating action in advance of moving the concentrate along such sloping path.

3. A method as claimed in claim 1 in which the recirculated middlings constitute about 15–20% of the feed.

4. A method for concentrating a feed of ore tailings, waste ore, or crushed fine ores containing slimes, comprising the steps of classifying the feed directly as received to reject particles above a predetermined size and deliver feed below such predetermined size to a primary sump; injecting the feed from such primary sump tangentially into a concentrator to flow helically upwardly therethrough; injecting water under pressure into said concentrator at a level above the level of feed injection to flow helically downwardly therethrough; subjecting the helically upwardly flowing feed to the helically downwardly flowing stream of clean water to separate the feed into tailings and slimes, middlings, and concentrate; subjecting the tailings and slimes to a vortex action in the concentrator to move them axially upwardly of the concentrator to waste; ejecting middlings tangentially from such concentrator and recirculating the middlings to such primary sump; withdrawing the concentrate axially downwardly of the concentrator for discharge into a secondary sump; subjecting the feed from said secondary sump to a substantially equivalent concentrating action with vortex discharge of slimes and tailings axially upwardly of the concentrator to waste and tangential ejection of middlings and recirculation thereof to the secondary sump; withdrawing the concentrate axially downwardly of the concentrator for discharge from the secondary concentrator; moving the concentrate from the secondary concentrator in substantially segregated masses upwardly along a sloping path while flowing water over the segregated masses to wash fines therefrom; discharging fines and water from the lower end of such path and discharge of the separated concentrate from the upper end of said path into a rough concentrate sump; subjecting the feed from said rough concentrates sump to a substantially equivalent concentrating action with vortex discharge of slimes and tailings axially upwardly of the concentrator to waste and tangential ejection of middlings and recirculation thereof to the rough concentrates sump; withdrawing the concentrate axially downwardly of the concentrator for discharge from the vortex; moving the concentrate in substantially segregated masses upwardly along a second sloping path while flowing water over the segregated masses to wash fines therefrom; discharging fines and water from the lower end of such second path; discharging the separated concentrate from the upper end of said second path; and de-watering the discharged concentrate.

5. A method for concentrating a feed of ore tailings, waste ore, or crushed fine ores containing slimes, comprising the steps of classifying the feed directly as received to reject particles above a predetermined size and deliver feed below such predetermined size to a primary sump; injecting the feed from such primary sump tangentially into a concentrator to flow helically upwardly therethrough; injecting water under pressure into said concentrator to flow helically downwardly therethrough; subjecting the helically upwardly flowing feed to the helically downwardly flowing stream of clean water to separate the feed into tailings and slimes; subjecting the tailings and slimes to a vortex action to flow axially upwardly of the concentrator to waste; ejecting middlings tangentially from such concentrator and recirculating the middlings to such primary sump; withdrawing the concentrate axially downwardly of the concentrator for discharge into a secondary sump; subjecting the feed from said secondary sump to a substantially equivalent concentrating action with vortex discharge of slimes and tailings axially upwardly of the vortex to waste and tangential ejection of middlings and recirculation thereof to the secondary sump; withdrawing the concentrate axially downwardly of the concentrator for discharge from the secondary concentrator; moving the concentrate from the secondary concentrator in substantially segregated masses upwardly along a sloping path while flowing water over the segregated masses to wash fines therefrom; discharging fines and water from the lower end of such path into a middlings sump; discharging the separated concentrate from the upper end of said path into a rough concentrates sump; subjecting the feed from said middlings sump to a substantially equivalent concentrating action with vortex discharge of slimes and tailings axially upwardly of the concentrator to waste and tangential ejection of middlings and recirculation thereof to the middlings sump; withdrawing the concentrate axially downwardly of the concentrator for discharge from the vortex; moving the concentrate in substantially segregated masses upwardly along a second sloping path while flowing water over the segregated masses to wash fines therefrom; discharging fines and water from the lower end of such second path; discharging the separated concentrate from the upper end of said second path into the rough concentrates sump; subjecting the feed from said rough concentrates sump to a substantially equivalent concentrating action with vortex discharge of slimes and tailings axially upwardly of the concentrator to waste and tangential ejection of middlings and recirculation thereof to the rough concentrates sump; withdrawing the concentrate axially downwardly of the concentrator for discharge from the concentrator; moving the concentrate in substantially segregated masses upwardly along a third sloping path while flowing water over the segregated masses to wash fines therefrom; discharging fines and water from the lower end of such third path for recirculation to the middlings sump; and discharging the separated concentrate from the upper end of said third path; and de-watering the discharged concentrate.

6. A method as claimed in claim 5 including the steps of discharging the overflow of the primary, secondary, and middlings sumps to waste, and recirculating the overflow of the rough concentrate sump to the secondary sump.

7. Apparatus for concentrating a feed of ore tailings waste ore, or crushed fine ores containing slimes comprising, in combination, a supply hopper; classifying means beneath the hopper outlet to reject particles above a predetermined size and deliver feed below such predetermined size to a sump; at least one multi-stage concentrator including a plurality of structurally identical annular units superposed in coaxial relation to define a substantially cylindrical upright concentrating chamber, having closed upper and lower ends except for a vortex tube extending axially of the concentrator and through the closed upper end, and having a lateral outlet above the uppermost unit, and an axial concentrate discharge opening in the lower end, the lower end of the vortex tube terminating just above said discharge opening, a cone splitter below and axially aligned with the vortex tube and effective to split tailings from concentrate flowing to the concentrate outlet, each unit having a separate spirally disposed passage therein having a tangentially extending outer end, an initial part of each passage spiralling around the respective unit exteriorly of its inner surface in a substantially diametric plane of the unit for at least 360 degrees, an intermediate and continuing part of each passage circling axially at an incline along the inner periphery of the unit, a terminal and continuing part of each passage spiralling along the inner periphery of the respective unit in a substantially diametric plane of the unit, each passage, at a point intermediate the ends of the intermediate part thereof, gradually opening through the inner periphery of the unit from zero opening to full extent at the inner terminal end of the passage, and gradually decreasing in depth to zero at the inner terminal end of the passage to form a flat, the topmost unit constituting a middlings ejection unit and having an orientation such that the intermediate part of its passage spirals downwardly within the chamber, the unit immediately beneath the topmost unit having the same orientation as the topmost unit, so that the intermediate part of its passage spirals downwardly within the chamber, and constituting a water injection stage, the next lower unit constituting a feed injection stage and having an orientation reversed with respect to the orientation of the two units thereabove so that the intermediate part of its passage spirals upwardly within the chamber, the flats of the two lower units being aligned; means connecting said sump to the feed injection stage of said concentrator to inject feed tangentially into the latter; means connecting a source of clean water to the water injection stage of said concentrator to inject clean water into the latter; means connecting the middlings ejection stage of said concentrator to said primary sump to recirculate the middlings; the unclassified feed passing along the passage of the lowermost unit with separation of concentrate from tailings by centrifugal force, with the tailings being carried by the air flow to the vortex tube to move upwardly therethrough for ejection through such lateral outlet; the concentrate moving along the outer wall of the passage of the lowermost unit, upwardly of said chamber, and along the outer wall of the passage of the next unit thereabove with further separation of concentrate and tailings by centrifugal force; the spiral spray of water from the water injection unit washing tailings from the concentrate passing along the inwardly opening parts of the passages of the lowermost unit and the unit immediately thereabove; and the middlings moving along the passage of the uppermost unit for ejection from the tangential outer end thereof for such recirculation to the primary sump; at least one upwardly sloping and travelling endless concentrating conveyor having feed segregating pockets on its outer surface and means for flowing clean water over feed in the pockets to wash tails from the feed downwardly for discharge from the lower end of the conveyor, and means for adjusting the conveyor slope and speed; means directing concentrate from the outlet of said concentrator into the pockets of said conveyor; and a de-watering device receiving concentrate and wash water from the upper end of said conveyor.

8. Apparatus as claimed in claim 7 in which said concentrator includes a fourth annular unit structurally identical with each of the other three annular units and constituting a water injection stage disposed below and coaxially with the feed injection stage and having an orientation corresponding to that of the topmost unit and the unit immediately below the topmost unit.

9. Apparatus as claimed in claim 8 including a second concentrator comprising three of said structurally identical annular units constituting, respectively, a topmost middlings ejection stage, an intermediate water injection stage, and a lowermost feed injection stage; a second sump connected to the concentrate outlet of the four-stage concentrator; a pump connected to said sump and to the feed injection stage of the second concentrator to inject feed from said second sump into said feed injection stage of said second concentrator; and means directing concentrate from the outlet of said second concentrator into the pockets of said conveyor.

References Cited in the file of this patent

UNITED STATES PATENTS

| | | |
|---|---|---|
| 2,909,283 | Duesling | Oct. 20, 1959 |
| 2,930,484 | Rodman | Mar. 29, 1960 |